US011205174B2

(12) United States Patent
Xu et al.

(10) Patent No.: US 11,205,174 B2
(45) Date of Patent: Dec. 21, 2021

(54) METHOD AND SYSTEM FOR PROCESSING SECURE OFFLINE TRANSACTIONS

(71) Applicant: Tencent Technology (Shenzhen) Company Limited, Shenzhen (CN)

(72) Inventors: Jiajie Xu, Shenzhen (CN); Runda Cai, Shenzhen (CN); Leteng Weng, Shenzhen (CN); Zhenyu Xu, Shenzhen (CN); Jinhai Liu, Shenzhen (CN); Dacheng Zhuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 135 days.

(21) Appl. No.: 16/424,099

(22) Filed: May 28, 2019

(65) Prior Publication Data
US 2019/0279202 A1 Sep. 12, 2019

Related U.S. Application Data

(63) Continuation of application No. 15/000,581, filed on Jan. 19, 2016, now Pat. No. 10,354,249, which is a
(Continued)

(30) Foreign Application Priority Data

Jan. 7, 2014 (CN) .......................... 201410007102.6

(51) Int. Cl.
*G06Q 20/00* (2012.01)
*G06Q 20/38* (2012.01)
(Continued)

(52) U.S. Cl.
CPC ........... *G06Q 20/382* (2013.01); *G06Q 20/20* (2013.01); *G06Q 20/202* (2013.01);
(Continued)

(58) Field of Classification Search
CPC ..................................................... G06Q 20/202
(Continued)

(56) References Cited

U.S. PATENT DOCUMENTS 7,379,916 B1 5/2008 Mizrah
7,681,228 B2 3/2010 Mizrah
(Continued)

FOREIGN PATENT DOCUMENTS

CN 1357850 A 7/2002
CN 1622104 A 6/2005
(Continued)

OTHER PUBLICATIONS

Tencent Technology, IPRP, PCT/CN2015/070150, dated Jul. 12, 2016, 5 pgs.
(Continued)

*Primary Examiner* — Rokib Masud
(74) *Attorney, Agent, or Firm* — Morgan, Lewis & Bockius LLP

(57) ABSTRACT

This application discloses a method implemented at a server to facilitate secure offline transactions. The server receives, from a client device, an authorization request that includes a user identifier, first financial account information and a secure code. The server authenticates the authorization request, and sends a first transaction approval to the client device. Then, in accordance with the information received in the authorization request, the server facilitates a secure transaction between the client device and a point-of-sale (POS) machine while the client device is offline. Specifically, the server receives, from the POS machine, a transaction request that includes at least the user identifier and the security code. The server retrieves the first financial account information from a memory according to the user identifier and the security code, performs a transaction operation
(Continued)

associated with the first financial account information, and sends a second transaction approval to the POS machine.

20 Claims, 8 Drawing Sheets

Related U.S. Application Data continuation of application No. PCT/CN2015/070150, filed on Jan. 6, 2015.

(51) Int. Cl.
    *H04W 4/021*     (2018.01)
    *H04L 29/06*     (2006.01)
    *G06Q 20/20*     (2012.01)
    *G06Q 20/32*     (2012.01)
    *G06Q 20/40*     (2012.01)
    *H04W 12/77*     (2021.01)

(52) U.S. Cl.
    CPC ....... *G06Q 20/3274* (2013.01); *G06Q 20/385* (2013.01); *G06Q 20/40* (2013.01); *H04L 63/10* (2013.01); *H04W 4/021* (2013.01); *H04L 63/12* (2013.01); *H04L 63/18* (2013.01); *H04L 2463/102* (2013.01); *H04W 12/77* (2021.01)

(58) Field of Classification Search
    USPC ...................................................... 705/16, 21
    See application file for complete search history.

(56) References Cited

U.S. PATENT DOCUMENTS 9,613,355 B2 * 4/2017 Kurian ............. G06Q 20/38215
2004/0143550 A1   7/2004 Creamer
2006/0136317 A1   6/2006 Mizrah
2009/0254440 A1  10/2009 Pharris
2011/0247063 A1 * 10/2011 Aabye ................ G06Q 20/3829
                                                                                                           726/6
2011/0251892 A1 * 10/2011 Laracey ............ G06Q 30/0253
                                                                                                        705/14.51
2012/0166309 A1   6/2012 Hwang
2015/0006386 A1 * 1/2015 Tebbe .................. G06Q 20/326
                                                                                                            705/44

FOREIGN PATENT DOCUMENTS

| CN | 1928907 A | 3/2007 |
| --- | --- | --- |
| CN | 101702223 A | 5/2010 |
| CN | 101853453 A | 10/2010 |
| CN | 101990676 A | 3/2011 |
| CN | 102449651 A | 5/2012 |
| CN | 102842081 A | 12/2012 |
| CN | 103856640 A | 6/2014 |
| JP | 2004062771 A | 2/2004 |
| JP | 2011516980 A | 5/2011 |
| WO | WO 2009146106 A1 | 12/2009 |
| WO | WO 2013057540 A1 | 4/2013 |

OTHER PUBLICATIONS

Tencent Techknology, ISRWO, PCT/CN2015/070150, dated Apr. 3, 2015, 6 pgs.
Notification of First Office Action of Japanese application No. 2016-530346 dated Feb. 7, 2017, 5 pgs.
Notification of First office Action of Chinese application No. 201410007102.6 dated Dec. 2, 2014, 6 pgs.

* cited by examiner

```
┌─────────────────────────────────────────────────────────────┐
│ Facilitate a secure transaction between the client device and a │
│ point-of-sale (POS) machine while the client device is offline, by: │
│ 610                                                         │
│                         ( A )                               │
│                          │                                  │
│                          ▼                                  │
│  ┌─────────────────────────────────────────────────────┐   │
│  │ In accordance with the first transaction approval:   │   │
│  │                                                      │   │
│  │  ┌────────────────────────────────────────────────┐ │   │
│  │  │ Retrieve the first financial account information from the │ │
│  │  │ memory according to the user identifier and the security │ │
│  │  │ code 610B                                      │ │   │
│  │  └────────────────────────────────────────────────┘ │   │
│  │                       │                              │   │
│  │                       ▼                              │   │
│  │  ┌────────────────────────────────────────────────┐ │   │
│  │  │ Retrieve second financial account information from the │ │
│  │  │ memory according to the merchant identifier, wherein │ │
│  │  │ the second financial account information is associated │ │
│  │  │ with a second financial account owned by the merchant │ │
│  │  │ 610C                                           │ │   │
│  │  └────────────────────────────────────────────────┘ │   │
│  │                       │                              │   │
│  │                       ▼                              │   │
│  │  ┌────────────────────────────────────────────────┐ │   │
│  │  │ Perform a transaction operation associated with the │ │
│  │  │ order information between the first and second financial │ │
│  │  │ accounts 610D                                  │ │   │
│  │  └────────────────────────────────────────────────┘ │   │
│  │                       │                              │   │
│  │                       ▼                              │   │
│  │  ┌────────────────────────────────────────────────┐ │   │
│  │  │ Send a second transaction approval to the POS  │ │   │
│  │  │ machine 610E                                   │ │   │
│  │  └────────────────────────────────────────────────┘ │   │
│  └─────────────────────────────────────────────────────┘   │
└─────────────────────────────────────────────────────────────┘
```

FIG. 6B

METHOD AND SYSTEM FOR PROCESSING SECURE OFFLINE TRANSACTIONS

CROSS-REFERENCE TO RELATED APPLICATIONS

This application is a continuation of U.S. patent application Ser. No. 15/000,581, entitled "METHOD AND SYSTEM FOR PROCESSING SECURE OFFLINE TRANSACTIONS" filed on Jan. 19, 2016, which is a continuation of PCT Application No. PCT/CN2015/070150, entitled "METHOD AND SYSTEM FOR PROCESSING SECURE OFFLINE TRANSACTIONS" filed on Jan. 6, 2015, which claims priority to Chinese Patent Application No. 201410007102.6, entitled "METHOD AND SYSTEM FOR PROCESSING USER RESOURCE INFORMATION" filed on Jan. 7, 2014, all of which are incorporated by reference in their entireties.

TECHNICAL FIELD

The disclosed implementations relate generally to the field of wireless communication, and particularly to methods and systems for processing information related to purchase orders and account information of a user who is associated with an offline client device.

BACKGROUND

Wireless technology has developed rapidly over the past few decades, and thereby allows client devices to become mobile and implement all kinds of functions. Nowadays, in addition to basic functions of making phone calls and sending/receiving text messages, mobile devices also process information according to different predetermined manners in various applications. In a specific example, two mobile devices could be configured to process information related to two users that own the two mobile devices, respectively.

As a specific example, a user could place a purchase order on the mobile phone, and use the mobile phone to pay a merchant from his or her financial account. The mobile device sends the user's identifier and corresponding order information to a server, and the order information includes the user's financial account information and the merchant's identifier. The server then arranges transfer of the user's assets from the account owned by the user to another account owned by the merchant according to the order information.

Despite of its acceptable performance, the mobile device has to be communicatively coupled to one or more communication networks in the above method of processing a purchase order, when the user is making payment for the purchase order via the mobile device. However, in many situations, the mobile device is located in an area that does not have access to high quality communication networks, and the connection with the server could be unavailable or interrupted during the payment process. As such, when the mobile device becomes offline, secure transactions between the user and the merchant are also disabled. Therefore, there is a need to continue the secure transactions independently of whether the mobile device is online or offline.

SUMMARY

The above deficiencies and other problems associated with the conventional approaches for processing purchase orders or financial transactions are reduced or eliminated by the application disclosed below. In some embodiments, the application is implemented in a server system that has one or more processors, memory and one or more modules, programs or sets of instructions stored in the memory for performing multiple functions. Instructions for performing these functions may be included in a computer program product configured for execution by one or more processors.

One aspect of the application is a method implemented at a server system to facilitate secure offline transactions. The method includes receiving, from a client device, an authorization request that includes a user identifier, first financial account information and a secure code. The first financial account information is associated with a first financial account owned by a user who uses the client device and is identified by the user identifier. The secure code is used for verifying both the user and the client device. The method further includes authenticating the authorization request according to a predetermined data integrity check method, storing the user identifier, the first financial account information and the secure code in the memory of the server, and sending a first transaction approval to the client device. The method further includes facilitating a secure transaction between the client device and a point-of-sale (POS) machine while the client device is offline. To facilitate the secure transaction, the server system receives, from the POS machine, a transaction request that includes the user identifier, the security code, a merchant identifier associated with a merchant who uses the POS machine, and order information associated with a purchase order. The POS machine obtains from the client device an encrypted graphic code that is associated with the user identifier and the security code. In accordance with the first transaction approval, the server further facilitates the secure transaction by (1) retrieving the first financial account information from the memory according to the user identifier and the security code, (2) retrieving second financial account information from the memory according to the merchant, wherein the second financial account information is associated with a second financial account owned by the merchant, (3) performing a transaction operation associated with the order information between the first and second financial accounts, and (4) sending a second transaction approval to the POS machine.

Another aspect of the application is a server system that includes one or more processors, and memory having instructions stored thereon, which when executed by the one or more processors cause the processors to perform operations to implement the above method for facilitating secure offline transactions between a client device and a POS machine.

Another aspect of the application is a non-transitory computer-readable medium, having instructions stored thereon, which when executed by one or more processors cause the processors to perform operations to implement the above methods for facilitating secure offline transactions between a client device and a POS machine.

Various advantages of the present application would be apparent in light of the descriptions below.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIGS. 6A and 6B illustrate a flow chart of another exemplary method for facilitating secure offline transactions in accordance with some embodiments.

The present application will be further described in detail by means of embodiments with reference to the drawings, in order to make the implementation, features and advantages of the present application more clear.

DETAILED DESCRIPTION

In order to make the objects, technical schemes and advantages of the present application more clear and apparent, embodiments of the present application will now be described in further detail with reference to accompanying drawings.

Figure 1:
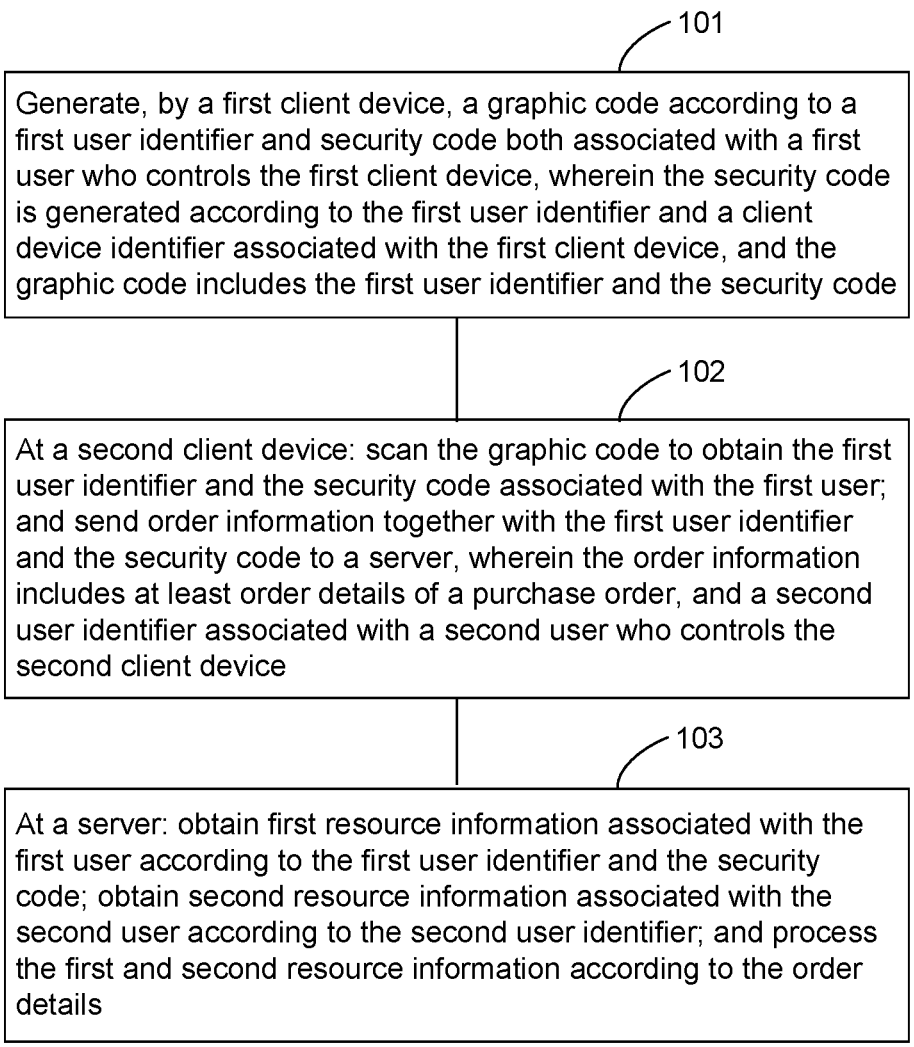
FIGS. 1-3 are flow charts of exemplary methods for facilitating secure offline transactions in accordance with some embodiments.
Figure 2:
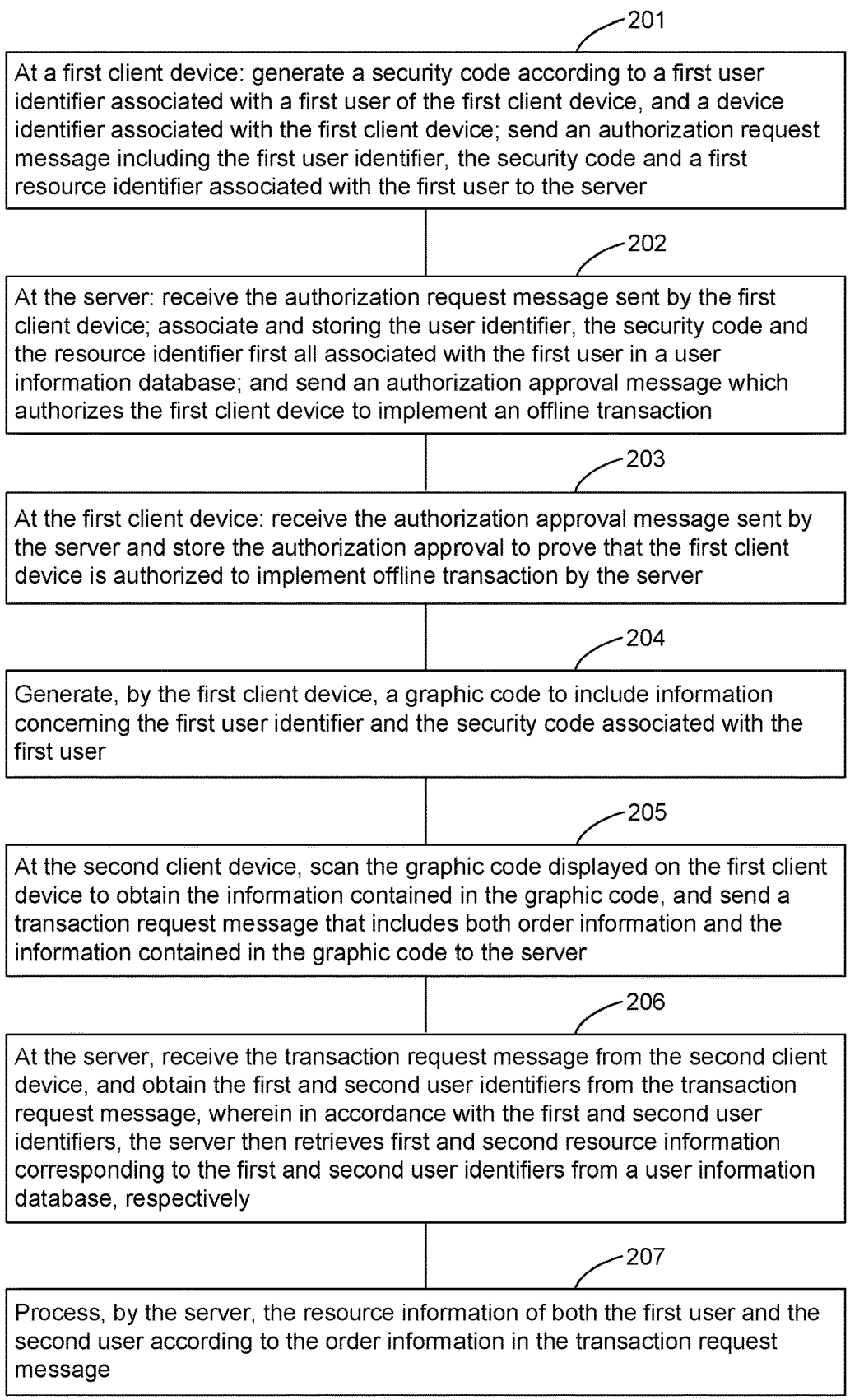
Figure 3:
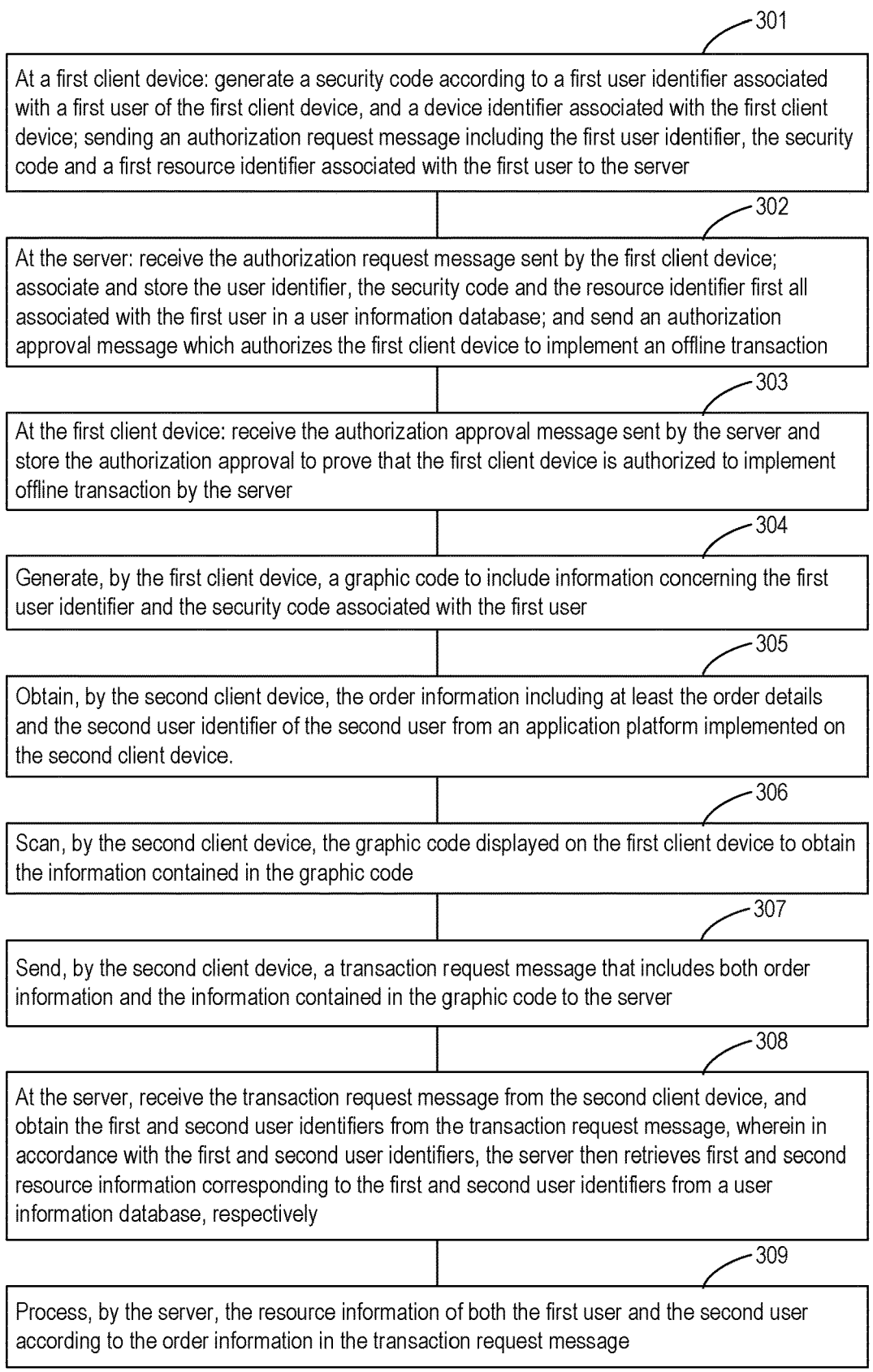

FIGS. 1-3 are flow charts of three exemplary methods 100, 200 and 300 for facilitating secure offline transactions in accordance with some embodiments. Each of methods 100, 200 and 300 is, optionally, governed by instructions that are stored in non-transitory computer readable storage media and that are executed by one or more processors of a server system and two client devices. Each of the operations shown in FIGS. 1-3 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in each of methods 100, 200 and 300 may be combined and/or the order of some operations may be changed.

It should be understood that the particular order in which the operations in each of FIGS. 1-3 have been described are merely exemplary and are not intended to indicate that the described order is the only order in which the operations could be performed. One of ordinary skill in the art would recognize various ways to facilitate offline transactions as described herein. Additionally, it should be noted that details of other processes described herein with respect to one of methods 100, 200 and 300 are also applicable in an analogous manner to the other two methods of methods 100, 200 and 300. It should also be noted that details of any process described herein with respect to one of methods 100, 200 and 300 are also applicable in an analogous manner to method 600 described below with reference to FIGS. 6A and 6B.

With reference to FIG. 1, this application provides a method for processing first resource information (e.g., information concerning a user and a user's financial account) in accordance with some embodiments. A first client device generates (101) a graphic code according to a first user identifier and a security code both associated with a first user who controls the first client device. In some embodiments, the security code is generated according to the first user identifier and a device identifier associated with the first client device. The graphic code includes the first user identifier and the security code in an encrypted format. The first client device has access to first resource information (e.g., information of a first financial account owned by the first user) that is associated with the first user but not included in the graphic code.

To process a purchase order, a second client device scans (102) the graphic code to obtain the first user identifier and the security code associated with the first user, and sends order information together with the first user identifier and the security code to a server. Here, the order information includes at least order details of a purchase order, and a second user identifier associated with a second user who controls the second client device.

The server obtains (103) first resource information associated with the first user according to the first user identifier and the security code. The server also obtains second resource information associated with the second user according to the second user identifier. Then, the server processes the first and second resource information according to the order details.

In a specific example, the first client device is a client device associated with a customer, and the second client device is another point-of-sale (POS) machine associated with a merchant. The client device could drop off the line, and the server facilitates an offline transaction for the customer. Specifically, the client device generates (101) a graphic code according to a customer identifier and a security code associated with the customer. In some implementations, the security code is generated according to the customer identifier and a device identifier of the client device, and the graphic code includes information concerning the customer identifier and the security code. The POS machine controlled by a merchant scans the graphic code to obtain the customer identifier and the security code associated with the customer, and sends order information of a purchase order together with the customer identifier and the security code to the server. Optionally, the order information includes a merchant identifier associated with the merchant, and order details of a purchase order (e.g., quantities and prices of the goods that are purchased by the customer from the merchant).

Further, the server obtains the customer's financial account information according to the customer identifier and the security code, and the merchant's financial account information according to the merchant identifier. The server then facilitates a payment from a customer's financial account to a merchant's financial account according to the order details, and the corresponding financial account information. In some implementations, prior to receiving the order information concerning the purchase order, the server has stored the respective financial account information corresponding to the customer identifier and the merchant identifier in a memory.

Alternatively, in some embodiments, the first client device is a POS machine associated with a merchant, and the second client device is a client device associated with a customer. The server facilitates a payment from the user to the merchant by encoding the merchant identifier and a corresponding security code in the graphic code, and providing the graphic code to the client device. The client device thereby sends the merchant identifier, the security code associated with the merchant, and the order information of the purchase order to the server. In this situation, the order information includes the client identifier and the order details. As such, the merchant's POS machine is offline, and the server facilitates an offline transaction for the merchant.

In some embodiments, the server obtains the first resource information of the first user according to the first user identifier and the security code by obtaining a resource identifier associated with the first resource information according to the first user identifier and the security code, and using the resource identifier to retrieve the first resource information of the first user in the local memory of the server.

In some embodiments, before the server obtains the first resource information according to the first user identifier and the security code, the first client device generates the security code according to the first user identifier and the client device identifier of the first client device, and sends the first user identifier, the security code and the resource identifier of the first user to the server. The server stores the first user identifier, the security code and the resource identifier of the first user in a user information database, such that the server could use these information items to process a purchase order or a financial transaction. Further, in some embodiments, after generating the security code according to the first user identifier and the device identifier of the first client device, the first client device also stores the security code in a memory of the first client device.

In some embodiments, the server processes the first and second resource information according to the order details by: reducing part of the user's resource identified by the first resource information from the user's resource and adding the reduced part of the user's resource to the merchant's resource that is identified by the second resource information of the second user. In an example, the server reduces the payment for a purchase order from a customer's financial account, and transfers it to a merchant's financial account.

In some embodiments, the first client device generates the graphic code according to the first user identifier and the security code both associated with the first user. The security code is generated according to the first user identifier and the device identifier of the first client device, and the graphic code includes the first user identifier and the security code. The second client device scans the graphic code to obtain the first user identifier and the security code, and sends the order information, the first user identifier and the security code to the server. Here, the order information includes at least the order details and the second user identifier of the second user. Then, the server obtains the first resource information of the first user according to the first user identifier and the security code, and the second resource information of the second user according to the second user identifier. The first and second resource information is associated with a first resource owned by the first user of the first client device and a second resource owned by the second user of the second client device, respectively. The server processes the resource information of the first user and the second user according to the order details.

Under many circumstances, the first client device generates a graphic code even when it is not communicatively coupled to any communication network. The second client device obtains the information included in graphic code independently of the status of the communication network associated with the first client device. Therefore, even when the first client device is offline, the second client device could still send the order information, the first user identifier and the security code to the server via its network connection, allowing the server to complete transactions. As such, when the network condition is poor and the first client device has no or limited connection to any network, a user of the first client device can still complete transactions with other users (e.g., a merchant).

FIG. 2 is a flow chart of another exemplary method 200 for facilitating secure offline transactions in accordance with some embodiments. Like method 100, method 200 is implemented to process user resource information (e.g., information concerning a user and a user's financial account). In some situations, the first client device needs to process a transaction based on the resource information associated with both the first and second users. However, the network condition is so poor that the first client device cannot connect to a communication network to implement the transaction in a secure manner. Method 200 is applied to implement the transaction for the first client device that does not have any access or have limited access to a secure communication network.

The first client device generates (201) a security code according to a first user identifier associated with a first user of the first client device, and a device identifier associated with the first client device. The first client device sends an authorization request message including the first user identifier, the security code and a first resource identifier associated with the first user to the server.

Specifically, in some embodiments, the first client device obtains the first user identifier of the first user and the device identifier of the first client device; takes a respective predetermined number of characters from each of the first user identifier and the client device identifier; combines the two predetermined numbers of characters into the security code; encrypts the first user identifier, the security code and the resource identifier of the first user; and sends the authorization request message that carries the encrypted first user identifier, the encrypted security code and the encrypted resource identifier to the server.

Optionally, the first client device uses a first predetermined number of characters at the beginning, middle or end of the first user identifier to form the security code. Optionally, the first client device uses a second predetermined number of characters at the beginning, middle or end of the device identifier of the first client device to form the security code. In some embodiments, the first user identifier is associated with a user account used by the first user to log onto a social network application, e.g., an instant messaging application. It might be possible for the first user's friends in the social network application to obtain the first user identifier, and however, the security code is difficult to obtain because the security code also includes part of the device identifier which is confidential information. As such, the security code improves the security level of processing the first resource information associated with the first user.

In some embodiments, the first client device is a mobile device, e.g., a smart phone, a tablet computer, a laptop computer, a personal digital assistant (PDA) and the like. The first resource identifier is an account identifier of a bank account or credit card account associated with the first user. Optionally, the first resource identifier is associated with an account that stores virtual currency for the first user.

In a specific example, the first client device includes a mobile phone. The mobile phone obtains the first user identifier (e.g., "IM1") of first user Buyer1, and the client device identifier (e.g., "Phone1") of the mobile phone corresponding to first user Buyer1. Then, the mobile phone obtains one character "M" with a first predetermined number (i.e., 1) at a first predetermined position from first user identifier "IM1" and obtains two characters "h" and "n" with a second predetermined number (i.e., 2) at second predetermined positions from client device identifier "Phone1." After combining the obtained characters into a character string "Mhn" according to a predetermined sequence, the mobile phone generates a combined character string "Mhn" as the security code. The mobile phone encrypts first user identifier "IM1," security code "Mhn," and resource identifier "C1" of the first user according to a predetermined encryption method, and sends the authorization request message which includes the encrypted first user identifier "IM1," the security code "Mhn," and the encrypted resource identifier "C1" to the server. Further, in some embodiments, the first client device also stores the security code in a local memory.

Further, in some embodiments, the first client device generates an integrity check data item according to the first user identifier, the security code and the resource identifier of the first user, and includes the integrity check data item in the authorization request message. The server uses the integrity check data item to authenticate the first user identifier, the security code and the resource identifier.

The server receives (202) the authorization request message sent by the first client device. The server then associates and stores the user identifier, the security code and the resource identifier first all associated with the first user in a user information database. After storing the information associated with the first user, the server sends an authorization approval message which authorizes the first client device to implement an offline transaction.

Specifically, the server receives an authorization request message sent by the first client device, and obtains an encrypted first user identifier, an encrypted security code and an encrypted resource identifier included in the authorization request message. The server decrypts the encrypted first user identifier, security code and resource identifier, stores such information locally in a database, and sends the authorization approval message to the first client device.

In a specific example, the server receives the authorization request message sent by the mobile phone and decrypts the encrypted first user identifier (e.g., "IM1"), the security code (e.g., "Mhn") and the resource identifier (e.g., "C1") of the first user carried by the authorization request message according to a predetermined decryption method. Then, the server stores these information items in a table (e.g., Table 1) of a user information database, and sends an authorization approval message to the mobile phone to authorize the mobile phone to implement an offline transaction with a third party.

TABLE 1

A User Information Table

| User identifier | Security code | Resource identifier |
|---|---|---|
| IM1 | Mhn | C1 |
| ... | ... | ... |

Further, in some embodiments, the server also obtains a first integrity item at a first predetermined position of the first user identifier, a second integrity item from a second predetermined position of the security code, and a third integrity item from a third predetermined position of the resource identifier according to a predetermined integrity check method defined for checking integrity of data communicated between the server and the first client device. The first, second and third integrity items are thereby combined to form a comprehensive integrity check data item according to the predetermined integrity check method. After generating the comprehensive integrity check data item, the server compares the comprehensive integrity check data item with the integrity check data item received from the first client device in the authorization request message. If the two integrity check data items are consistent, the server stores the first user identifier, the security code and the resource identifier in the user information database, and sends the authorization approval to the first client device. Alternatively, if the two integrity check data items are not consistent, the server sends an authorization failure message that informs the first client device that the first client device is not authorized to conduct an offline transaction because of the failure in verifying the integrity check.

The first client device receives (203) the authorization approval message sent by the server and stores the authorization approval to prove that the first client device is authorized to implement offline transaction by the server. In a specific example, the first client device includes a mobile phone. The mobile phone receives the authorization approval message sent by the server and stores the authorization approval to prove that the mobile device is authorized to implement offline transaction by the server.

Then, the first client device stores the authorization approval carried by the authorization approval message in a local memory. When the first user uses the first client device to process the resource information (e.g., financial account information) of the first user and the second user, and when the network condition is poor, the above authorization process does not need to be performed to authorize the first device for the purpose of implementing the corresponding secure transaction.

After receiving the authorization approval message from the server and storing the authorization approval in its local memory, the first user uses the first client device to process resource information according to the following operations (e.g., operations 204-207).

In some embodiments, the first client device generates (204) a graphic code to include information concerning the first user identifier and the security code associated with the first user. Prior to generating the graphic code, the first client device determines whether the authorization approval exists in its local memory. If no authorization approval is detected, above operations 201-203 are performed to allow the server to authorize the first client device. Alternatively, if the authorization approval is detected in the local memory, the first client device generates the graphic code. More specifically, the first client device obtains the first user identifier of the first user, and obtains the stored security code from its local memory. Then, the first client device encrypts the first user identifier and the security code with a predetermined encryption method. After encryption, the first client device generates a graphic code that includes the encrypted first user identifier and the encrypted security code.

In a specific example, the mobile phone obtains the first user identifier "IM1" of first user Buyer1, and obtains the stored security code "Mhn" from the local memory. Then, the mobile phone encrypts the first user identifier "IM1" and the security code "Mhn" with the predetermined encryption method, and generates a graphic code by combining the encrypted first user identifier "IM1" and security code "Mhn" according the predetermined graphic code generation method. Therefore, the graphic code includes information of the encrypted first user identifier "IM1" and the encrypted security code "Mhn."

The second client device scans (205) the graphic code displayed on the first client device to obtain the information contained in the graphic code and sends a transaction request message that includes both order information and the information contained in the graphic code to the server. Specifically, the second client device scans the graphic code on the first client device, and parses the graphic code with a predetermined graphic code parsing method to obtain the encrypted first user identifier and the encrypted security code encoded in the graphic code.

Here, the second client device is owned by a second user. The second client device is communicatively coupled to one or more communication networks, and stores a second user identifier that identifies the second user. The order information includes the second user identifier, and optionally, second resource information associated the second user. Optionally, the second resource information includes information of a bank or credit account, and is provided by the second user prior to or during the course of the present transaction. Then, the second client device sends a transaction request message including the order information, the encrypted first user identifier, and the encrypted security code to the server.

Optionally, the second client device includes a financial transaction machine, such as a POS machine. Optionally, the order information includes order details concerning the purchase order, e.g., types, quantities, and prices of goods that are included in the purchase order.

In some embodiments, when the second client machine include a POS machine, the POS machine scans the graphic code on the mobile phone, parses the graphic code in accordance with a predetermined graphic code parsing method, and thereby obtains information included in the graphic code (e.g., the first device identifier and the security code). The POS machine obtains the order information, including the second user identifier (e.g., L1) of the second user that has been stored in a local memory, the order details concerning the purchase order, and optionally the second resource information associated with the second user. The POS machine is communicatively coupled to one or more communication networks, and therefore, sends to the server the transaction request message including the order information and the information included in the graphic code.

The server receives the transaction request message (206) from the second client device. The server obtains the first and second user identifiers from the transaction request message. In accordance with the first and second user identifiers, the server then retrieves first and second resource information corresponding to the first and second user identifiers from a user information database, respectively.

Specifically, the server receives the transaction request message sent by the second client device and decrypts the information included in the graphic code carried by the transaction request message to obtain the first user identifier and the security code. Then the server obtains a resource identifier of the first user from the user information database, and obtains the first resource information according to the resource identifier of the first user. Then, the server also obtains the resource identifier of the second user from the user information database according to the second user identifier in the transaction request message. In accordance with the resource identifier of the second user, the server obtains the second resource information of the second user.

In a specific example, the server receives the transaction request message sent by the POS machine and decrypts the information included in the graphic code carried by the transaction request message according to the graphic code generation method. Thus, the server obtains the first user identifier "IM1" and the security code "Mhn." The server obtains the resource identifier C1 of first user Buyer1 from a table the user information database as shown in table 1 according to the first user identifier "IM1" and the security code "Mhn." Then, the server obtains the first resource information of first user Buyer1 according to the resource identifier C1 of first user Buyer1. Further, the server obtains the resource identifier S1 of the second user from the user information database as shown in table 2 according to the second user identifier L1 in the transaction request message. The server obtains the second resource information of the second user according to the resource identifier S1.

TABLE 2

A User Information Table

| Second user identifier | Resource identifier |
|---|---|
| L1 | S1 |
| ... | ... |

The server processes (207) the resource information of both the first user and the second user according to the order information in the transaction request message.

Specifically, in some embodiments, the server reduces account balance of a first financial account associated with the first resource information according to the order information, and adds the reduced account balance to a second financial account associated with the second resource information. As such, the first user pays for the purchase order from his or her financial account to the financial account owned by the second user.

Alternatively, in some embodiments, the server reduces the account balance from the second financial account associated with the second resource information according to the order information, and adds the reduced account balance to the first financial account associated with the first resource information. As such, the second user pays for the purchase order from his or her financial account to the financial account owned by the first user.

After processing the first resource information of the first user and the second user, the server sends a transaction approval (e.g., a second transaction approval) to approve this specific transaction between the first and second client devices.

In a specific example, the server reduces an amount of $100 from the account balance of the first account owned by the first user according to the order information provided by the second client device, and adds the amount of $100 to the account balance of the second account owned by the second user.

In various embodiments of the application, the first client device generates the graphic code according to the first user identifier and the security code associated with the first user. The security code is generated according to the first user identifier and a client device identifier of the first client device. The graphic code includes the first user identifier and the security code. The second client device scans the graphic code to obtain the first user identifier and the security code, and sends order information with the first user identifier and the security code to the server. The order information includes at least order details of a purchase order and the second user identifier of the second user. The server obtains the first resource information of the first user according to the first user identifier and the security code, obtains the second resource information of the second user according to the second user identifier, and processes the first resource information of the first user and the second user according to the order information.

The first client device generates the graphic code independently of whether it has a high quality connection with a secure communication network. Even when the secure communication network is not available, the second client device obtains the information included in the graphic code, and sends the order information, the first user identifier and the security code graphic code to the server through its own connection to the network. As such, the server is enabled to process the user resource information independently of whether the first client device is communicatively coupled to any secure communication network. Thus, when the network condition is poor and the first client device has no or limited network connection, the transaction (e.g., the purchase order) can still be processed via the second client device's secure network connections.

FIG. 3 is a flow chart of another exemplary method 300 for facilitating secure offline transactions in accordance with some embodiments. In some situations, the first client device needs to process a transaction based on the resource information associated with both the first and second users. However, the network condition is so poor that the first client device cannot connect to a communication network to implement the transaction in a secure manner. Method 300 is applied to implement the transaction for the first client device that has no or limited access to a secure communication network.

Steps 301-303 of method 300 are identical to steps 201-203 of method 200, respectively. For brevity, the details of each operation in steps 301-303 are not repeated here.

After receiving an authorization approval from the server, the first client device generates (304) a graphic code including information concerning the first user identifier and the security code. Prior to generating the graphic code, the first client device determines whether the authorization approval exists in its local memory. If no authorization approval is detected, above operations 301-303 are performed to allow the server to authorize the first client device. Alternatively, if the authorization approval is detected in its local memory, the first client device generates the graphic code. More specifically, the first client device obtains the first user identifier of the first user, and obtains the stored security code from its local memory. Then, the first client device encrypts the first user identifier and the security code with a predetermined encryption method. After encryption, the first client device generates a graphic code that includes the encrypted first user identifier and the encrypted security code according to a predetermined graphic code generation method.

In a specific example, the mobile phone obtains the first user identifier "IM1" of first user Buyer1, and obtains the stored security code "Mhn" from the local memory. Then, the mobile phone encrypts the first user identifier "IM1" and the security code "Mhn" with the predetermined encryption method, and generates a graphic code by combining the encrypted first user identifier "IM1" and security code "Mhn" according the predetermined graphic code generation method. Therefore, the graphic code includes information of the encrypted first user identifier "IM1" and the encrypted security code "Mhn."

The second client device obtains (305) the order information including at least the order details and the second user identifier of the second user from an application platform implemented on the second client device. In some embodiments, the second client device receives a user input of an order identifier from the second user of the second client device. The second client device is coupled to a communication network, and sends an information request message that includes the order identifier to an application server that manages the application platform implemented on the second client device. Then, the application server receives the information request message, obtains corresponding order information from an order information database, and provides the order information to the second client device. The order information includes order details and a second user identifier, and the order details include types, quantities, and prices of goods that are included in a purchase order associated with the order identifier.

In some embodiments, when the second client machine include a POS machine owned by a merchant. The POS machine receives order identifier "Order1" inputted by the owner of the POS machine (i.e., the second user and the merchant). The POS machine is communicatively coupled to one or more communication networks, and sends the information request message including order identifier "Order1" to an application server that manages the application platform implemented on the second client device. Then, the server receives the information request message, obtains corresponding order information from its order information database as shown in table 3 according to order identifier "Order1." The order information comprises the order details 100 and the second user identifier L1 of the second user Seller1, and sends the order information to the POS machine.

TABLE 3

A Table in an Order Information Database Stored in an Application Server

| Order identifier | Order information | |
|---|---|---|
| | Order details | Second user identifier |
| "Order1" | 100 | L1 |
| ... | ... | ... |

The second client device scans (306) the graphic code displayed on the first client device to obtain the information contained in the graphic code. Specifically, the second client device scans the graphic code on the first client device, and parses the graphic code with a predetermined graphic code parsing method to obtain the encrypted first user identifier and the encrypted security code encoded in the graphic code. In some embodiments, a POS machine scans the graphic code displayed on a mobile phone and parses the graphic code by the predetermined graphic code parsing method to obtain the encrypted first user identifier and the encrypted security code included in the graphic code.

The second client device sends (307) a transaction request message that includes both the order information and the information contained in the graphic code to the server. The second client device is communicatively coupled to one or more communication networks, and sends these information items via one of the one or more communication networks. In a specific example, a POS machine is communicatively coupled to a secure communication network, and sends the transaction request message which carries the order information, the encrypted first user identifier and the encrypted security code to the server.

The server receives (308) the transaction request message from the second client device, obtains the first resource information of the first user according to the first user identifier and the security code, and obtains the second resource information of the second user according to the second user identifier.

Specifically, the server receives the transaction request message sent by the second client device and decrypts the information included in the graphic code carried by the transaction request message to obtain the first user identifier and the security code. Then the server obtains a resource identifier of the first user from the user information database, and obtains the first resource information according to the resource identifier of the first user. Then, the server also obtains the resource identifier of the second user from the user information database according to the second user identifier in the transaction request message. In accordance with the resource identifier of the second user, the server obtains the second resource information of the second user.

In a specific example, the server receives the transaction request message sent by the POS machine and decrypts the information included in the graphic code carried by the transaction request message according to the graphic code generation method. Thus, the server obtains the first user identifier "IM1" and the security code "Mhn." The server obtains the resource identifier C1 of first user Buyer1 from a table the user information database as shown in table 1 according to the first user identifier "IM1" and the security code "Mhn." Then, the server obtains the first resource information of first user Buyer1 according to the resource identifier C1 of first user Buyer1. Further, the server obtains the resource identifier S1 of the second user Seller 1 from the user information database as shown in table 2 according to the second user identifier L1 in the transaction request message. The server obtains the second resource information of second user Seller1 according to the resource identifier S1.

The server processes (309) the resource information of both the first user and the second user according to the order information in the transaction request message.

Specifically, in some embodiments, the server reduces account balance of a first financial account associated with the first resource information according to the order information, and adds the reduced account balance to a second financial account associated with the second resource information. As such, the first user pays for the purchase order from his or her financial account to the financial account owned by the second user.

After processing the first resource information of the first user and the second user, the server sends a transaction approval (e.g., a second transaction approval) to approve this specific transaction between the first and second client devices.

In a specific example, the server reduces an amount of $100 from the account balance of the first account owned by the first user according to the order information provided by the second client device, and adds the amount of $100 to the account balance of the second account owned by the second user.

In various embodiments of the application, the first client device generates the graphic code according to the first user identifier and the security code associated with the first user. The security code is generated according to the first user identifier and a client device identifier of the first client device. The graphic code includes the first user identifier and the security code. The second client device scans the graphic code to obtain the first user identifier and the security code, and sends order information with the first user identifier and the security code to the server. The order information includes at least order details of a purchase order and the second user identifier of the second user. The server obtains the first resource information of the first user according to the first user identifier and the security code, obtains the second resource information of the second user according to the second user identifier, and processes the first resource information of the first user and the second user according to the order information.

The first client device generates the graphic code independently of whether it has a high quality connection with a secure communication network. Even when the secure communication network is not available, the second client device obtains the information included in the graphic code, and sends the order information, the first user identifier and the security code graphic code to the server through its own connection to the network. As such, the server is enabled to process the user resource information independently of whether the first client device is communicatively coupled to any secure communication network. Thus, when the network condition is poor and the first client device has no or limited network connection, the transaction (e.g., the purchase order) can still be processed via the second client device's secure network connections.

Figure 4:
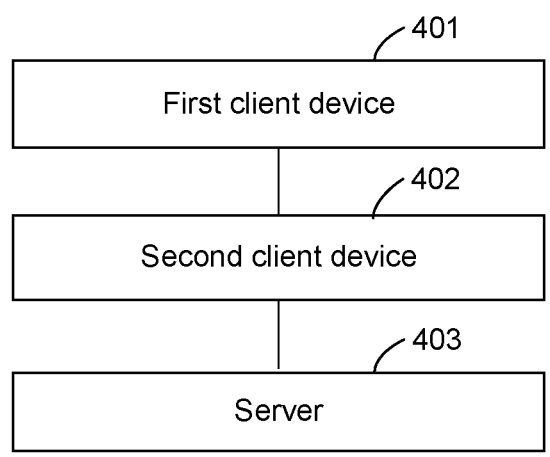
FIG. 4 is a block diagram of an exemplary offline transaction system for facilitating secure offline transactions in accordance with some embodiments.

FIG. 4 is a block diagram of an exemplary offline transaction system 400 for facilitating secure offline transactions in accordance with some embodiments. Offline transaction system 400 includes a first client device 401, a second client device 402 and a server 403. First client device 401 is configured to generate a graphic code according to a first user identifier and a security code both associated with a first user. The security code is further generated according to the first user identifier and a device identifier associated with first client device 401. Thus, the graphic code includes the first user identifier and the security code.

Second client device 402 is configured to scan the graphic code to obtain the first user identifier and the security code, and send order information with the first user identifier and the security code to server 403. The order information includes at least order details concerning a purchase request and a second user identifier associated with a second user of second client device 402.

Server 403 is configured to obtain first resource information of the first user according to the first user identifier and the security code, obtain second resource information of the second user according to the second user identifier, and process the resource information of the first user and the second user according to the order details.

In some embodiments, server 403 is configured to obtain the resource identifier of the first user from a user information database according to the first user identifier and the security code, and thereby the first resource information of the first user according to the resource identifier of the first user.

Further, in some embodiments, first client device 401 is also configured to generate the security code according to the first user identifier and the device identifier of first client device, and sends the first user identifier, the security code and the resource identifier of the first user to the server. Server 403 is configured to store the first user identifier, the security code and the resource identifier of the first user in the user information database.

Further, first client device 401 is also configured to store the security code in a local memory.

Server 403 is also configured to reduce account balance of a first financial account associated with the first resource information according to the order information, and add the reduced account balance to a second financial account associated with the second resource information.

In various embodiments of the application, the first client device generates the graphic code according to the first user identifier and the security code associated with the first user. The security code is generated according to the first user identifier and a client device identifier of the first client device. The graphic code includes the first user identifier and the security code. The second client device scans the graphic code to obtain the first user identifier and the security code, and sends order information with the first user identifier and the security code to the server. The order information includes at least order details of a purchase order and the second user identifier of the second user. The server obtains the first resource information of the first user according to the first user identifier and the security code, obtains the second resource information of the second user according to the second user identifier, and processes the first resource information of the first user and the second user according to the order information.

The first client device generates the graphic code independently of whether it has a high quality connection with a secure communication network. Even when the secure communication network is not available, the second client device obtains the information included in the graphic code, and sends the order information, the first user identifier and the security code graphic code to the server through its own connection to the network. As such, the server is enabled to process the user resource information independently of whether the first client device is communicatively coupled to any secure communication network. Thus, when the network condition is poor and the first client device has no or limited network connection, the transaction (e.g., the purchase order) can still be processed via the second client device's secure network connections.

Figure 5:
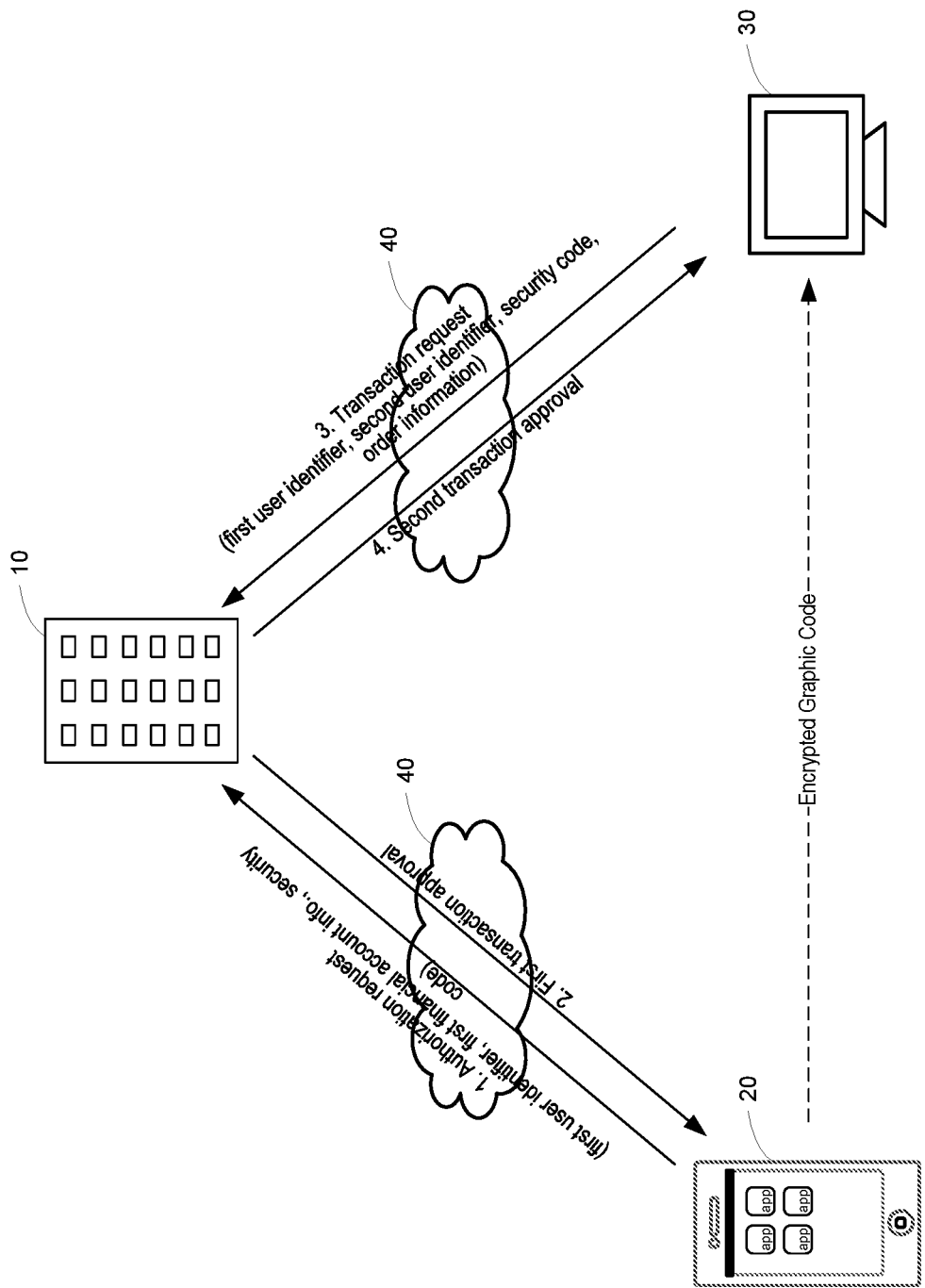
FIG. 5 is an exemplary offline transaction process in which information is exchanged among a server system and two client devices in accordance with some embodiments.

FIG. 5 is an exemplary offline transaction process 500 in which information is exchanged among a server system 10 and two client devices 20 and 30 in accordance with some embodiments. In some situations, one of the two client devices (e.g., a first client device 20) has no or limited connection to a secure communication network. However, the secure transaction could still be implemented via communication between a server and the other one of the two client device (e.g., a second client device 30), if information associated with first client device 20 is provided to the server before it loses the connection to the secure communication network.

Prior to any offline transaction, first client device 20 sends an authorization request to server 30 to ask for an authorization to get involved in an offline transaction when no secure network can be identified. The authorization request includes a first user identifier, first financial account information, and a security code. The first user identifier identifies a first user of first client device 20, and the first financial account information is associated with a first financial account owned by the first user. In some embodiments, the security code includes part of the first user identifier and part of a device identifier that identifies first client device 20, such that when the server receives the security code, it could verify that the security code comes from a user account on first client device 20 associated with the first user.

In some embodiments, the authorization request further includes an integrity check data item, and the integrity check data item is generated by first client device 20 from the user identifier, the first financial account information and the secure code according to a predetermined data integrity check method. After verifying the integrity check data item according to the predetermined data integrity check method, server 10 returns a first transaction approval to first client device 20, and stores the first user identifier, first financial account information, and the security code in a user information database. On the side of first client device 20, it is authorized by server 10 to get involved in an offline transaction from this moment on, even when it has no or limited access to secure communication networks. Optionally, server 10 allows first client device 20 to get involved in offline \transactions for a predetermined duration of time (e.g., the next 60 days) or till server 10 receives another notice from the first user to stop any more offline transaction.

In a subsequent offline transaction, first client device 20 encrypts the first user identifier and the security code in a graphic code. Here, the first financial account information is limited in first client device 20 and server 10, and not encoded for transmission to any other client devices. First client device 20 then provides the encrypted graphic code to a second client device 30. Second client device 30 obtains information concerning the first user identifier and the security code from the encrypted graphic code, and generates a transaction request. This transaction request includes the information concerning the first user identifier and the security code, a second user identifier, and order information. The second user identifier identifies a second user of second client device 30. The order information includes information concerning a purchase order between the first and second users. In some embodiments, the order information includes one or more of types, quantities, and prices of goods that are included in the purchase order.

Upon receiving the transaction request, server 10 verifies the first user identifier and the security code according to user identifiers and corresponding security codes that are stored in the user information database of server 10. Server 10 then identifies financial account information for the first and second users of the first and second client devices, respectively, and enables the secure transaction between these two users by sending a second transaction approval to the second client device. When second client device 30 receives the second transaction approval, and authorizes the second user to complete the purchase order by providing goods or service to the user of the first client machine.

In some embodiments, second client device 30 includes a POS machine owned by the second user, and the second user is hereby a merchant of the goods involved in the purchase order. Stated another way, second client device 30 is a POS machine owned by a merchant.

In some embodiments, first client device 20 includes a mobile device owned by the first user, and the first user is hereby a customer of the goods involved in the purchase order. Stated another way, first client device 20 is a client device owned by a customer.

In various embodiment of the present application, communications between server 10 and first client device 20 or between server 10 and second client device 30 are enabled by communication network(s) 40. Communication networks 40 can be one or more networks having one or more type of topologies, including but not limited to the Internet, intranets, local area networks (LANs), cellular networks, Ethernet, Storage Area Networks (SANs), telephone networks, Bluetooth personal area networks (PAN) and the like. First client device 20 initiates the offline transaction process 500, when communication networks 40 are disabled, lost or substantially weakened between server 10 and first client device 20.

Figure 6A:
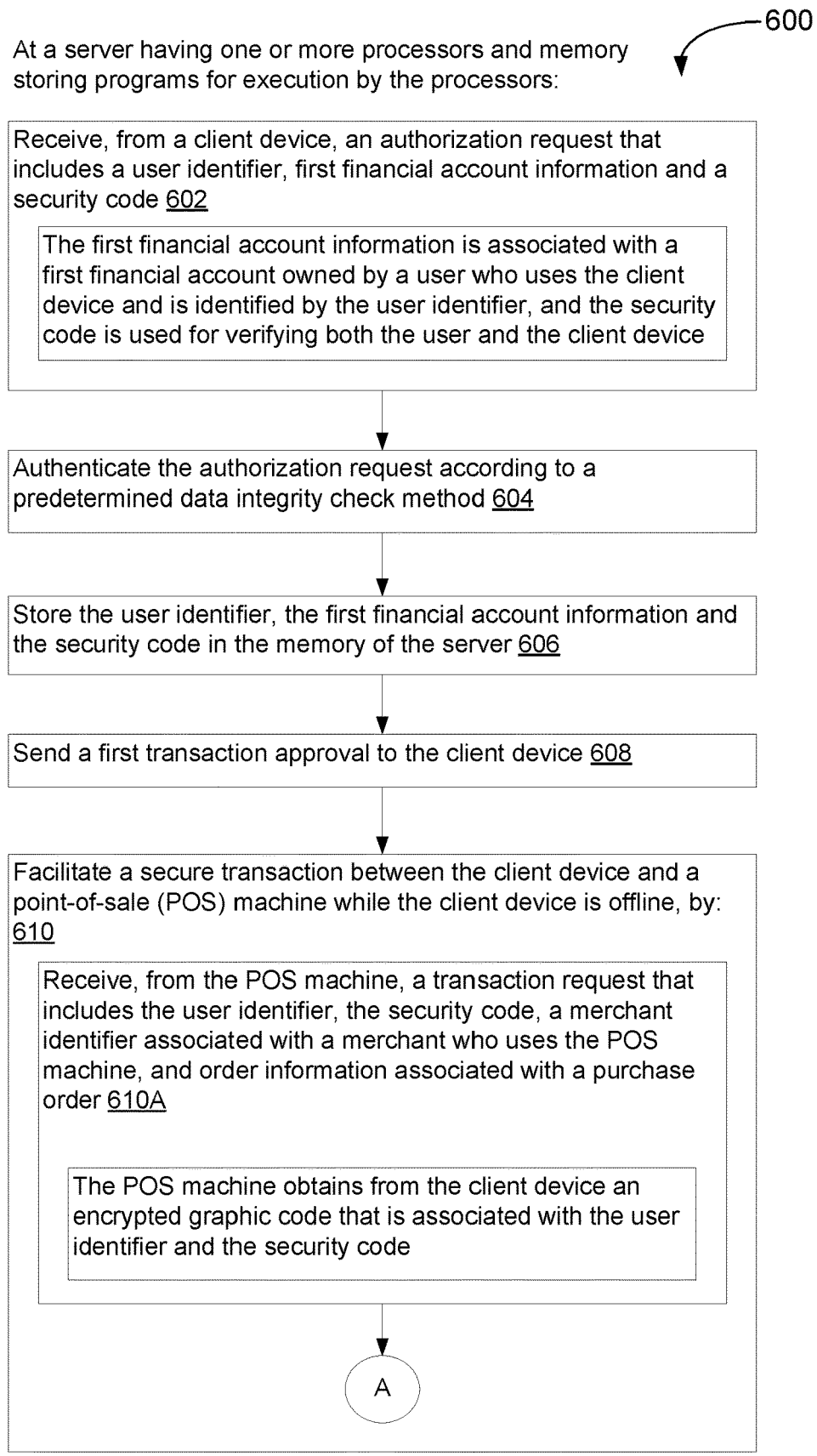

FIGS. 6A and 6B illustrate a flow chart of an alternative exemplary method 600 for facilitating secure offline transactions in accordance with some embodiments. Each of methods 200, 300 and 400 is, optionally, governed by instructions that are stored in a non-transitory computer readable storage medium and that are executed by one or more processors of a server system. Each of the operations shown in FIGS. 2-4 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in each of methods 200, 300 and 400 may be combined and/or the order of some operations may be changed.

Method 600 is implemented at a server system to facilitate secure offline transactions. The server system receives (602), from a client device, an authorization request that includes a user identifier, first financial account information and a secure code. The first financial account information is associated with a first financial account owned by a user who uses the client device and is identified by the user identifier, and the secure code is used for verifying both the user and the client device.

The server system authenticates (604) the authorization request according to a predetermined data integrity check method, stores (606) the user identifier, the first financial account information and the secure code in the memory of the server, and sends (608) a first transaction approval to the client device. In some embodiments, the security code includes at least part of the user identifier and part of a device identifier associated with the client device.

In some embodiments, the authorization request further includes an integrity check data item, and the integrity check data item is generated by the client device from the user identifier, the first financial account information and the secure code according to the predetermined data integrity check method.

After storing the information associated with the user and sending the first transaction approval, the server system facilitates (610) a secure transaction between the client device and a POS machine while the client device is offline. Specifically, the server system receives (610A), from the POS machine, a transaction request that includes the user identifier, the security code, a merchant identifier associated with a merchant who uses the POS machine, and order information associated with a purchase order. The POS machine obtains from the client device an encrypted graphic code that is associated with the user identifier and the security code. In some embodiments, the order information includes types, quantities, and prices of goods that are included in the purchase order placed with the merchant by the user of the client device.

In accordance with the first transaction approval, the server system retrieves (610B and 610C) the first financial account information from the memory according to the user identifier and the security code, and second financial account information from the memory according to the merchant identifier. The second financial account information is associated with a second financial account owned by the merchant. The server system then performs (610D) a transaction operation associated with the order information between the first and second financial accounts, and sends (610E) a second transaction approval to the POS machine.

In some embodiments, the encrypted graphic code includes a two-dimensional bar code, and the client device is configured to encode the user identifier and the security code to the two-dimensional bar code after receiving the first transaction approval. The POS machine obtains the user identifier and the security code from the client device by scanning the two-dimensional bar code. Further, in some embodiments, the server receives the user identifier and the security code in a format of the two-dimensional bar code, and decodes the two-dimensional bar code to obtain the user identifier and the security code associated with the client device.

In some embodiments, the POS machine receives the second transaction approval, and authorizes an agent of the merchant to complete the purchase order by providing goods or service to the user of the client machine. In some embodiments, the POS machine is configured to provide virtual goods to the user of the client device.

In some embodiments, the server receives the authorization request from and sends the first transaction approval to the client device in an encrypted format. Also, in some embodiments, the server receives the transaction request from and sends the second transaction approval to the POS machine in an encrypted format.

In some embodiments, each of the first and second financial account information includes at least one of an account number, an account holder's name, a financial entity name and an account authorization code.

In some embodiments, each of the first or second financial account is a bank account or a credit card account, and the server enables payment for the purchase order by requesting a monetary transfer from the first financial account of the user to the second financial account of the merchant.

It should be understood that the particular order in which the operations in each of FIGS. 2-4 have been described are merely exemplary and are not intended to indicate that the described order is the only order in which the operations could be performed. One of ordinary skill in the art would recognize various ways to facilitate offline transactions as described herein. Additionally, it should be noted that details of other processes described herein with respect to one of methods 200, 300 and 400 are also applicable in an analogous manner to the other two methods of methods 200, 300 and 400.

Alternatively, in some implementations not illustrated in FIGS. 6A and 6B, a POS machine owned by a merchant has no or limited access to a secure communication network. A server receives, from a POS machine, an authorization request that includes a merchant identifier, first financial account information and a secure code. The first financial account information is associated with a first financial account owned by a merchant who uses the POS machine and is identified by the merchant identifier, and the secure code is used for verifying both the merchant and the POS machine. The server authenticates the authorization request according to a predetermined data integrity check method, storing the merchant identifier, the first financial account information and the secure code in the memory of the server and sending a first transaction approval to the POS machine. The server facilitates a secure transaction between the POS machine and a client device while the POS machine is offline, by receiving, from the client device, a transaction request that includes the merchant identifier, the security code, a user identifier associated with a user who uses the client device, and order information associated with a purchase order. The POS machine obtains from the client device an encrypted graphic code that is associated with the merchant identifier and the security code.

Further, to facilitate the offline transaction, the server (1) retrieve the first financial account information from the memory according to the merchant identifier and the security code, (2) retrieving second financial account information from the memory according to the user identifier, wherein the second financial account information is associated with a second financial account owned by the user, (3) performing a transaction operation associated with the order information between the first and second financial accounts, and (4) sending a second transaction approval to the client device.

Figure 7:
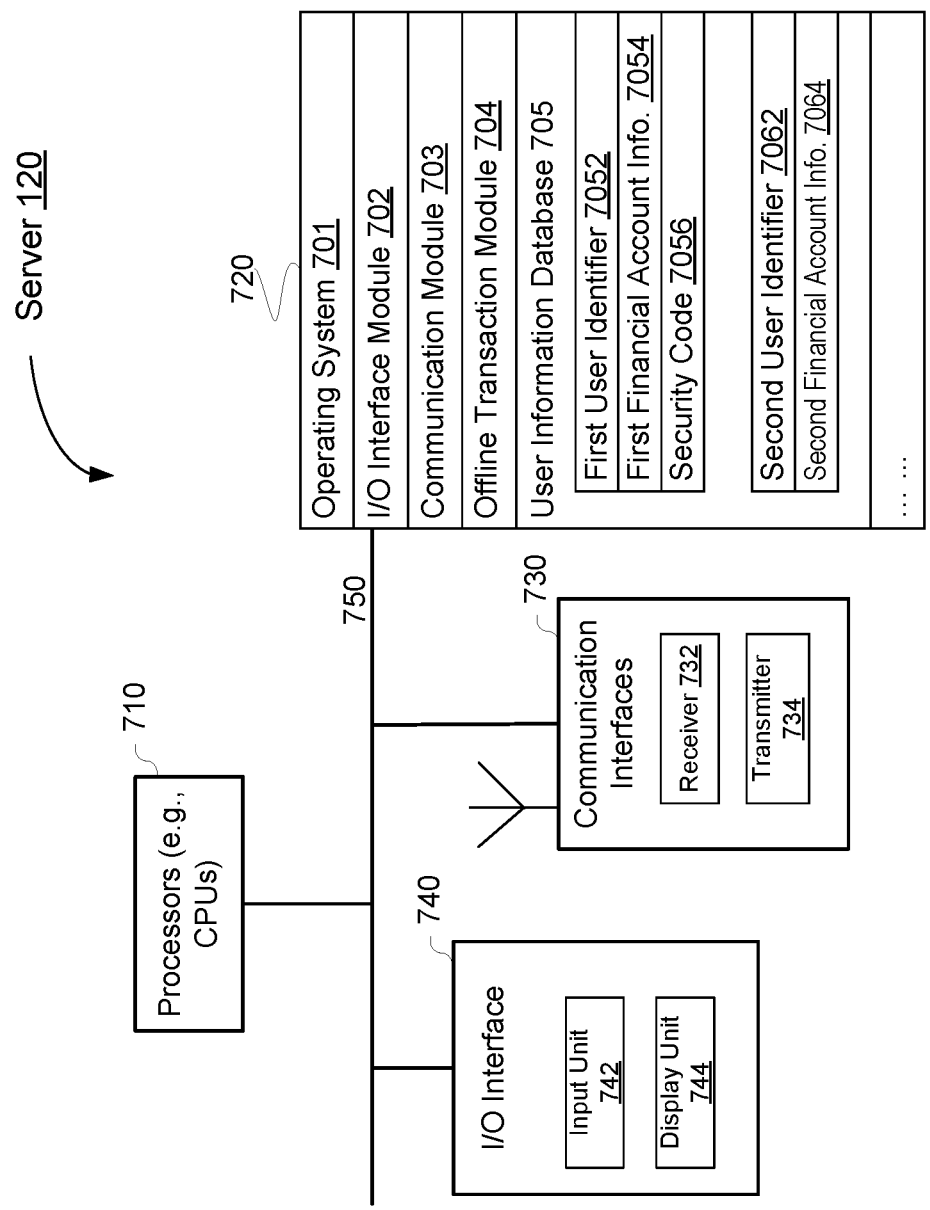
FIG. 7 is a block diagram of a server system that is configured to facilitate secure offline transactions in accordance with some embodiments.

FIG. 7 is a block diagram of a server system 10 that is configured to facilitate secure offline transactions in accordance with some embodiments.

In some implementations, server system 10 at least includes one or more processors 710 (e.g., central processing units) and a memory 720 for storing data, programs and instructions for execution by one or more processors 710. In some implementations, server system 10 further includes one or more communication interfaces 730, an input/output (I/O) interface 740, and one or more communication buses 750 that interconnect these components.

In some embodiments, I/O interface 740 includes an input unit 742 and a display unit 744. Examples of input unit 742 include a keyboard, a mouse, a touch pad, a game controller, a function key, a trackball, a joystick, a microphone, a camera and the like. Additionally, display unit 744 displays information that is inputted by the user or provided to the user for review. Examples of display unit 744 include, but are not limited to, a liquid crystal display (LCD) and an organic light-emitting diode (OLED) display. In some implementations, input unit 742 and display unit 744 are integrated on a touch-sensitive display that displays a graphical user interface (GUI).

In some embodiments, communication buses 530 include circuitry (sometimes called a chipset) that interconnects and controls communications between system components. In some embodiments, communication interfaces 730 further include a receiver 732 and a transmitter 734.

In some embodiments, memory 720 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 720 includes one or more storage devices remotely located from the one or more processors 710. In some embodiments, memory 720, or alternatively the non-volatile memory device(s) within memory 720, includes a non-transitory computer readable storage medium.

In some embodiments, memory 720 or alternatively the non-transitory computer readable storage medium of memory 720 stores the following programs, modules and data structures, instructions, or a subset thereof:

- Operating System 701 that includes procedures for handling various basic system services and for performing hardware dependent tasks;
- I/O interface module 702 that includes procedures for handling various basic input and output functions through one or more input and output devices, wherein I/O interface module 702 further includes an interface display module that controls displaying of a graphical user interface;
- Communication module 703 that is used for connecting server system 10 to other computational devices (e.g., servers and client devices), via one or more network communication interfaces 750 (wired or wireless) and one or more communication networks, such as the Internet, other wide area networks, local area networks, metropolitan area networks, and so on;
- Offline transaction module 704 that receives information associated with a first user prior to a transaction, and uses such information to facilitate secure transactions between this first user and a second user later when the first user has no or limited access to a secure communication network; and
- User information database 705 that stores information associated with a plurality of users, such as user identifiers 7052 and 7062, security codes 7056 and financial account information 7054 and 7064, wherein a respective user of the plurality of users is optionally a customer or a merchant, and the information associated with the plurality of users are organized in one or more tables.

More details on functions of offline transaction module 704 are explained above with reference to FIGS. 1-6.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. In a specific example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for facilitating secure offline transactions via a social networking application, comprising:
   at a server having one or more processors and memory storing programs for execution by the processors:
      receiving, from a client device, an authorization request that includes a user identifier of a first user account of the social networking application, first financial account information and a security code, wherein the first financial account information is associated with a first financial account owned by a user who uses the client device to log into the social networking application and is identified by the user identifier, and the security code is generated by the client device according to the user identifier of the first user account and a device identifier of the client device and is used for verifying both the user and the client device;
      authenticating the authorization request according to a predetermined data integrity check method, storing the user identifier, the first financial account information and the security code in the memory of the server and sending a first transaction approval to the client device;
      receiving, from a point-of-sale (POS) machine, a transaction request that includes the user identifier, the security code, a merchant identifier of a second user account of the social networking application associated with a merchant who uses the POS machine, and order information associated with a purchase order, wherein the POS machine obtains the security code from the client device; and
      in accordance with the first transaction approval: (1) retrieving the first financial account information from the memory according to the user identifier and the security code, (2) retrieving second financial account information from the memory according to the merchant identifier, (3) performing a transaction operation associated with the order information between the first and second financial accounts, and (4) sending a second transaction approval to the POS machine.

2. The method of claim 1, wherein the client device is configured to encode the user identifier and the security code into a two-dimensional bar code after receiving the first transaction approval, and wherein the POS machine obtains the user identifier and the security code from the client device by scanning the two-dimensional bar code.

3. The method of claim 2, wherein the server receives the user identifier and the security code in a format of the two-dimensional bar code, and decodes the two-dimensional bar code to obtain the user identifier and the security code associated with the client device.

4. The method of claim 1, wherein the POS machine receives the second transaction approval, and authorizes an agent of the merchant to complete the purchase order by providing goods or service to the user of the client machine.

5. The method of claim 4, wherein the POS machine is configured to provide virtual goods to the user of the client device.

6. The method of claim 1, wherein the server receives the authorization request from and sends the first transaction approval to the client device in an encrypted format.

7. The method of claim 1, wherein the server receives the transaction request from and sends the second transaction approval to the POS machine in an encrypted format.

8. The method of claim 1, wherein the security code includes at least part of the user identifier and part of a device identifier associated with the client device.

9. The method of claim 1, wherein the authorization request further includes an integrity check data item, and the integrity check data item is generated by the client device from the user identifier, the first financial account information and the security code according to the predetermined data integrity check method.

10. The method of claim 1, wherein each of the first and second financial account information includes at least one of an account number, an account holder's name, a financial entity name and an account authorization code.

11. The method of claim 1, wherein each of the first or second financial account is a bank account or a credit card account, and the server enables payment for the purchase order by requesting a monetary transfer from the first financial account of the user to the second financial account of the merchant.

12. The method of claim 1, wherein the order information includes types, quantities, and prices of goods that are included in the purchase order placed with the merchant by the user of the client device.

13. A server, comprising:
   one or more processors;
   memory coupled to the one or more processors; and
   a plurality of program instructions stored thereon, which when executed by the one or more processors cause the processors to perform operations, comprising:
      receiving, from a client device, an authorization request that includes a user identifier of a first user account of the social networking application, first financial account information and a security code, wherein the first financial account information is associated with a first financial account owned by a user who uses the client device to log into the social networking application and is identified by the user identifier, and the security code is generated by the client device according to the user identifier of the first user account and a device identifier of the client device and is used for verifying both the user and the client device;

authenticating the authorization request according to a predetermined data integrity check method, storing the user identifier, the first financial account information and the security code in the memory of the server and sending a first transaction approval to the client device;

receiving, from a point-of-sale (POS) machine, a transaction request that includes the user identifier, the security code, a merchant identifier of a second user account of the social networking application associated with a merchant who uses the POS machine, and order information associated with a purchase order, wherein the POS machine obtains the security code from the client device; and in accordance with the first transaction approval: (1) retrieving the first financial account information from the memory according to the user identifier and the security code, (2) retrieving second financial account information from the memory according to the merchant identifier, (3) performing a transaction operation associated with the order information between the first and second financial accounts, and (4) sending a second transaction approval to the POS machine.

14. The server of claim 13, wherein the client device is configured to encode the user identifier and the security code into a two-dimensional bar code after receiving the first transaction approval, and wherein the POS machine obtains the user identifier and the security code from the client device by scanning the two-dimensional bar code.

15. The server of claim 13, wherein the POS machine receives the second transaction approval, and authorizes an agent of the merchant to complete the purchase order by providing goods or service to the user of the client machine.

16. The server of claim 13, wherein the security code includes at least part of the user identifier and part of a device identifier associated with the client device.

17. The server of claim 13, wherein the authorization request further includes an integrity check data item, and the integrity check data item is generated by the client device from the user identifier, the first financial account information and the security code according to the predetermined data integrity check method.

18. A non-transitory computer-readable medium, having instructions stored thereon, which when executed by one or more processors cause the processors to perform operations comprising:

receiving, from a client device, an authorization request that includes a user identifier of a first user account of the social networking application, first financial account information and a security code, wherein the first financial account information is associated with a first financial account owned by a user who uses the client device to log into the social networking application and is identified by the user identifier, and the security code is generated by the client device according to the user identifier of the first user account and a device identifier of the client device and is used for verifying both the user and the client device;

authenticating the authorization request according to a predetermined data integrity check method, storing the user identifier, the first financial account information and the security code in the memory of the server and sending a first transaction approval to the client device;

receiving, from a point-of-sale (POS) machine, a transaction request that includes the user identifier, the security code, a merchant identifier of a second user account of the social networking application associated with a merchant who uses the POS machine, and order information associated with a purchase order, wherein the POS machine obtains the security code from the client device; and in accordance with the first transaction approval: (1) retrieving the first financial account information from the memory according to the user identifier and the security code, (2) retrieving second financial account information from the memory according to the merchant identifier, (3) performing a transaction operation associated with the order information between the first and second financial accounts, and (4) sending a second transaction approval to the POS machine.

19. The non-transitory computer-readable medium of claim 18, wherein the first financial account is a bank account or a credit card account, and the server enables payment for the purchase order by requesting a monetary transfer from the first financial account of the user to the second financial account of the merchant.

20. The non-transitory computer-readable medium of claim 18, wherein the order information includes types, quantities, and prices of goods that are included in the purchase order placed with the merchant by the user of the client device.

* * * * *